United States Patent
Liu et al.

(10) Patent No.: US 10,452,713 B2
(45) Date of Patent: Oct. 22, 2019

(54) VIDEO ANALYSIS TECHNIQUES FOR IMPROVED EDITING, NAVIGATION, AND SUMMARIZATION

(71) Applicant: Apple Inc., Cupertino, CA (US)

(72) Inventors: Shujie Liu, Cupertino, CA (US); Ke Zhang, San Jose, CA (US); Xiaosong Zhou, Campbell, CA (US); Hsi-Jung Wu, San Jose, CA (US); Chris Y. Chung, Sunnyvale, CA (US); James O. Normile, Los Altos, CA (US); Douglas S. Price, Cupertino, CA (US); Albert E. Keinath, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/559,705

(22) Filed: Dec. 3, 2014

(65) Prior Publication Data
US 2016/0092561 A1    Mar. 31, 2016

Related U.S. Application Data

(60) Provisional application No. 62/057,807, filed on Sep. 30, 2014.

(51) Int. Cl.
*G06F 16/738* (2019.01)
*G06F 16/78* (2019.01)
(Continued)

(52) U.S. Cl.
CPC .......... *G06F 16/739* (2019.01); *G06F 16/745* (2019.01); *G06F 16/783* (2019.01);
(Continued)

(58) Field of Classification Search
USPC ................................................ 386/239–248
See application file for complete search history.

(56) References Cited

U.S. PATENT DOCUMENTS 6,877,134 B1 * 4/2005 Fuller ............... G06F 17/30265
707/999.104
7,362,946 B1 * 4/2008 Kowald ............... G11B 27/034
360/13
(Continued)

FOREIGN PATENT DOCUMENTS

EP           580757       9/2005
WO      2012110689       8/2012

OTHER PUBLICATIONS

"Auto Awesome Movies for Google+ Secretly Edits Your Best Videos into a Slick, Customizable Highlight Reel", Nick Summers, Oct. 29, 2013, pp. 1-2.
(Continued)

*Primary Examiner* — Hung Q Dang
(74) *Attorney, Agent, or Firm* — Robert C. Kowert; Meyertons, Hood, Kilvin, Kowert & Goetzel, P.C.

(57) ABSTRACT

Systems and processes for improved video editing, summarization and navigation based on generation and analysis of metadata are described. The metadata may be content-based (e.g., differences between neighboring frames, exposure data, key frame identification data, motion data, or face detection data) or non-content-based (e.g., exposure, focus, location, time) and used to prioritize and/or classify portions of video. The metadata may be generated at the time of image capture or during post-processing. Prioritization information, such as a score for various portions of the image data may be based on the metadata and/or image data. Classification information such as the type or quality of a scene may be determined based on the metadata and/or image data. The classification and prioritization information may be metadata and may be used to automatically remove undesirable portions of the video, generate suggestions during editing or automatically generate summary video.

16 Claims, 9 Drawing Sheets

(51) Int. Cl.
*G06F 16/74* (2019.01)
*G11B 27/34* (2006.01)
*G06K 9/00* (2006.01)
*G11B 27/031* (2006.01)
*G11B 27/30* (2006.01)
*G06F 16/783* (2019.01)

(52) U.S. Cl.
CPC ...... *G06F 16/7837* (2019.01); *G06F 16/7867* (2019.01); *G06K 9/00718* (2013.01); *G06K 9/00751* (2013.01); *G11B 27/031* (2013.01); *G11B 27/3081* (2013.01); *G11B 27/34* (2013.01)

(56) References Cited

U.S. PATENT DOCUMENTS

| | | | | |
|---|---|---|---|---|
| 7,409,144 | B2* | 8/2008 | McGrath | G06F 17/30784 348/222.1 |
| 2008/0304808 | A1* | 12/2008 | Newell | G06F 17/30029 386/278 |
| 2009/0185626 | A1* | 7/2009 | Seupel | G06F 17/30843 375/240.26 |
| 2010/0091113 | A1* | 4/2010 | Morioka | H04N 5/147 348/207.1 |
| 2012/0076357 | A1 | 3/2012 | Yamamoto et al. | |
| 2012/0079380 | A1* | 3/2012 | Tsai | G06F 17/30817 715/716 |
| 2013/0156321 | A1 | 6/2013 | Motoi et al. | |
| 2013/0215221 | A1* | 8/2013 | Wang | G06T 7/0042 348/43 |
| 2014/0282661 | A1* | 9/2014 | Martin | H04N 21/23418 725/18 |
| 2014/0333775 | A1* | 11/2014 | Naikal | H04N 7/181 348/159 |

OTHER PUBLICATIONS

"Google+ Completely Redesigned, Now Automatically enhances Photos and Highlights Your Best Shots", The Verge, accessed Sep. 23, 2014, pp. 1-80.

"Google+ Updates Auto Awesome with Video Highlight Reels and Action Shots", Brad Molen, Oct. 29, 2013, pp. 1-4.

"Highlight and Auto Enhance Launched at Google I/O as Powerful New Google+ Photo Tools-News-Trusted Reviews", accessed Sep. 23, 2014, pp. 1-7.

"See your best photos & videos using highlights", Google+ Help, accessed Sep. 23, 2014, pp. 1-2.

International Search Report and Written Opinion from PCT/US205/052751, dated Feb. 1, 2016, Apple Inc., pp. 1-19.

Tae-Hyun Hwag, et al., "MPEG-7 metadata for video-based GIS applications", IEEE, Learning from Earth's Shapes and Sizes: IGARSS 2003, IEEE International GeoScience and Remote Symposium: Jul. 21-25, 2003, pp. 3641-3643.

* cited by examiner

VIDEO ANALYSIS TECHNIQUES FOR IMPROVED EDITING, NAVIGATION, AND SUMMARIZATION

This application claims benefit of priority to U.S. Provisional Application No. 62/057,807, filed Sep. 30, 2014, which is hereby incorporated by reference in its entirety.

BACKGROUND

Technical Field

This disclosure relates generally to video analysis techniques for video editing, video navigation and video summarization, and in particular to improved video analysis techniques based on the determination, generation and analysis of image metadata for prioritization, classification and summarization of video data.

Description of the Related Art

Captured video may contain redundant, unnecessary and/or poorly filmed sections of video. Such undesirable forms of video may be caused by any number of factors. For example, a shaky camera, poor exposure, redundant scenes, partially obstructed scenes and unintended scenes that were not intended to be captured can exist in captured video.

Although various manual techniques may be known for lessening individual ones of some such characteristics, such techniques are often provided as part of a cumbersome or unwieldy process. For example, such techniques are often applied one-at-a-time and without any consideration of dependencies among other techniques that will also be applied or that have been applied. Such a process can be time consuming and require considerable knowledge of the particular techniques.

SUMMARY OF EMBODIMENTS

Embodiments of the present disclosure describe systems, devices and processes for improved video editing, summarization and navigation based on generation and analysis of video metadata. In some embodiments, the metadata may be based on either content-based metadata or non-content-based metadata and may be used to remove undesirable portions of video, generate video editing hints or suggestions for a video editing interface or may be used to automatically generate summary video (e.g., a highlight video that highlights the important parts of a video or videos).

For example, non-content-based metadata may include motion information, exposure information, orientation information, altitude information, focus position information, or location information from the device capturing the image data, or time data for when the image data for a plurality of frames was captured, and the like. In another example, content-based metadata may be based at least in part on analysis of the image data, such as differences between neighboring frames data, contrast and color distribution within an image or across images, text detection, landmark detection data, exposure data, key frame identification data, motion data, similarity data (e.g., for possible merge), or face detection data, and the like.

In some embodiments, the non-content-based metadata and/or the content-based metadata may be determined and/or generated in the image signal processor near-to or at about the same time as when the image data is captured and may be included as part of the video data output, in the same or different files, for example. Metadata may be determined/generated elsewhere (e.g., during post processing) in embodiments.

Prioritization information, such as a ranking, score, or the like, for portions or segments of the image data may be determined based on the metadata and/or analysis of the image data. The prioritization information itself may be metadata (e.g., incorporated into the video file for respective frames).

In embodiments, segments may be prioritized, defined with fixed rules, or natural segments within the video or a group of videos may be found. For example, the natural segments could be created by differences in camera motion, differences among scenes, differences in scene motion, differences in object motion, or differences in exposure/color/brightness, etc., in embodiments.

Classification information, such as desirability (e.g., based on face detection or image quality), scene, or location similarities or segments of video that have similar spatial or temporal characteristics, and the like, may be determined based on the metadata and/or analysis of the image data. The classification information itself may be metadata (e.g., incorporated into the video file for respective frames).

In embodiments, editing suggestions or a summary video may be generated based on prioritization and or classification information. The editing suggestions or summary video may be generated and displayed, by the capture device or by an application for editing, navigating and summarizing image data, such as a video editor, for example.

In embodiments, an image capture device (e.g., a video camera or camera-enabled phone) may include a metadata generator and/or a video analyzer as part of or coupled to the image signal processor of the device. The metadata generator component may generate metadata associated with the captured image data. In some embodiments, a video analyzer (e.g., as part of an image capture device or as part of a post-processing video editing application separate from the capture device) may include components for analyzing metadata and image data and generating prioritization and classification information, as describe herein.

These and other features and advantages will become apparent to those of ordinary skill in the art in view of the following detailed descriptions of the approaches presented herein.

Figure 1:
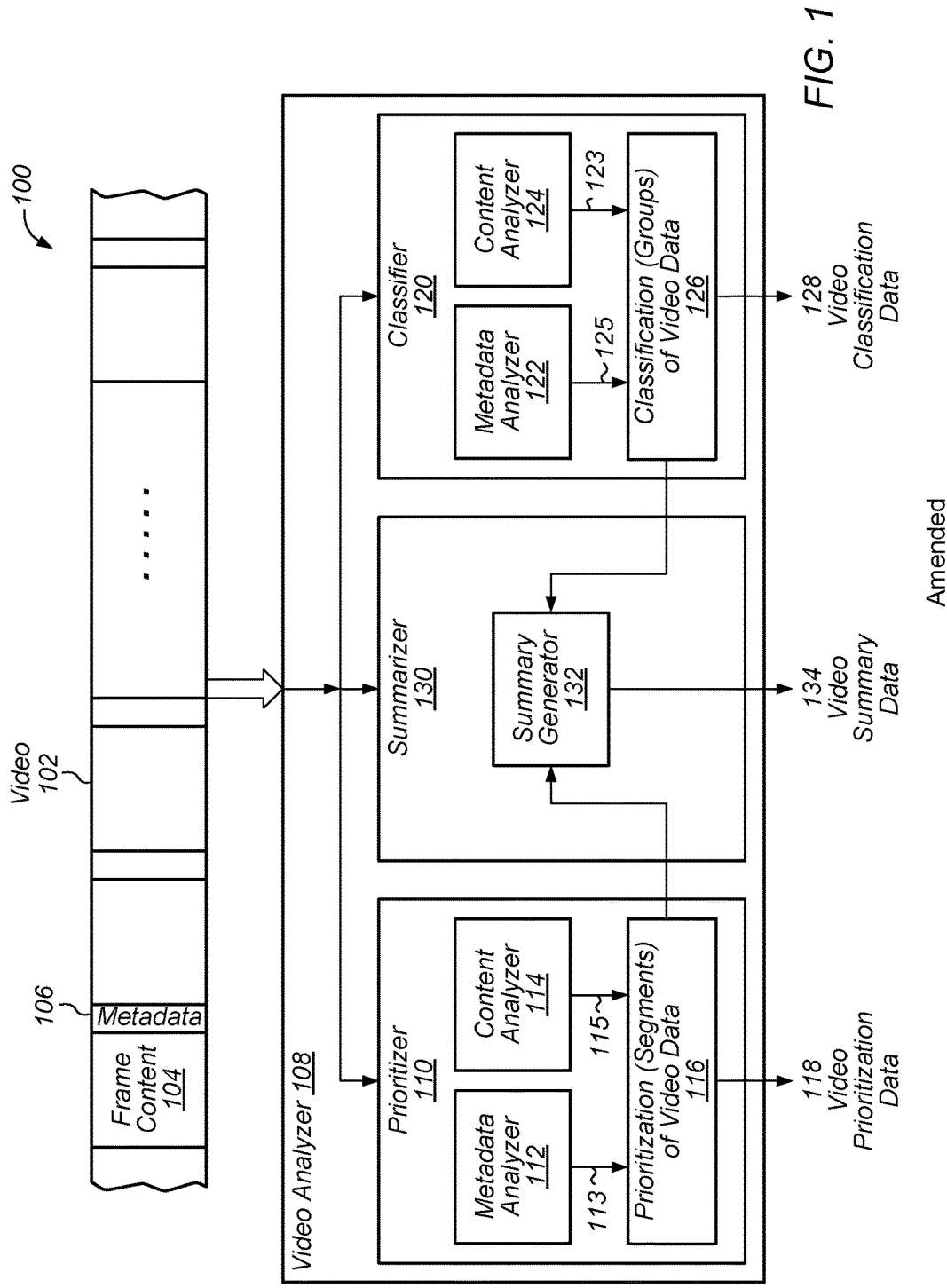
FIG. 1 illustrates a video analyzer, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g. a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a device, system and method for generating meta data for video and providing video analysis techniques for improved video editing, navigation and summarization are described.

Image data may include poorly captured images. For example, captured video may contain redundant, unnecessary, or poorly filmed sections caused by any number of issues. A shaky camera, poor exposure, redundancy, obstructions and unintended scenes may exist in captured video.

Embodiments disclosed herein describe techniques to detect, prioritize, and/or remove portions of image data. Such techniques can be useful for assisting with editing of videos or to automatically create summarized video, for example. Some disclosed techniques describe ways to classify portions of video into different scenes, groups or chapters. For example, segments in the same or different video sequences may have similarities, such as the same scenery or location or similar spatial or temporal characteristics. Redundant scenes may be removed or scenes that share a common location but were shot from a different angle or at a different time may be combined, in some embodiments. In another example, a summary of a video conference may include shortened sequences from the different participants.

In some embodiments, the analysis components, circuitry, systems and methods described herein may be implemented as part of various devices, including but not limited to, mobile phones that have video capture or video streaming functionality, tablet computing devices, personal video recording devices and/or other computing devices. A user of these devices may interact with a video editing application capable of analyzing image data and image metadata, so that it provides improved image editing, navigation and summarization tools.

Various embodiments disclosed herein describe generating image metadata, either by the image capture device or during subsequent processing. Some of the techniques disclosed herein describe analysis of the generated metadata or image data to determine prioritization or classification information for various portions of the image data. For example, segments of video data (e.g., frames or scenes) may be prioritized and groups of the video data (e.g., the same or other frames or scenes) may be classified. The prioritization and classification process may generate prioritization and classification metadata. This type of metadata may be used, in accordance with the various techniques disclosed herein to facilitate improved editing of image data. Additionally, this and other types of information may be used to provide hints or suggestions for editing, navigating and/or summarizing the image data. In some examples, the various types of metadata and analysis may be used to automatically generate summary video.

The techniques disclosed herein may also be used to facilitate improved navigation of video data or summary video. For example, image data may be analyzed to determine scenes and generate a summary video that includes only the most important scenes from the image data and navigation tools may be provided that navigate among the image data on a scene-by-scene basis. At least some of the techniques disclosed herein include analysis and generation of metadata associated with audio data that corresponds to the image data, for example, in a video.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for such devices are described. In some embodiments, the device is a portable communications device, such as a mobile telephone, that also contains other functions, such as PDA and/or music player functions. Exemplary embodiments of portable devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that may include a display and a touch-sensitive surface is described. It should be understood, however, that the electronic device may include one or more other physical user-interface devices, such as a physical keyboard, a mouse and/or a joystick.

Attention is now directed toward embodiments of a video analyzer that provides improved video editing, video navigation and summarization. FIG. 1 illustrates a video system 100 that includes video 102 and video analyzer 108. In various embodiments, video analyzer 108 may perform the processes described herein, for example the processes illustrated in FIGS. 2, 5, 6 and 8. In the illustrated embodiment, video analyzer 108 receives video 102. Video 102 may be received as part of the image signal processor, as output from the image signal processor from system memory of the video capture device or during post-processing on a device separate from the video capture device.

Video 102 is illustrated with frame content 104 and metadata 106. Various portions of video 102 may be described herein, for example video 102 may be prioritized into segments or classified into groups. In some embodiments, segments or groups may refer to similar types of portions, while in other embodiments, segments or groups may describe distinct types of portions. Such distinctions as those between segments and groups may recognize that prioritization and classification may be performed on portions of the video 102 that are not necessarily the same size sequence or are otherwise categorized differently for the respective type of analysis, in embodiments. For example, in some embodiments, classification may be performed on a frame-by-frame basis while prioritization may be performed on a scene-by-scene basis or vice-versa, although other basis are contemplated as well without departing from the scope of this disclosure.

Various embodiments may include other types of content such as audio content and corresponding audio metadata. In embodiments, metadata 106 may include any of the various types of metadata as are well known to one of skill as well as those described herein.

Video analyzer 108 is illustrated with prioritizer component 110, classifier component 120, and summarizer component 130. Embodiments may include more or less components than those disclosed and various embodiments are contemplated where the components are arranged other than in the manner disclosed. Such embodiments do not depart from the scope of this disclosure. For example, prioritizer component 110 and classifier component 120 both include a metadata analyzer and a content analyzer. In some embodiments, each component may include a customized metadata and content analyzer. In other embodiments, the components may be configured to interact with the same respective metadata and content analyzers.

Prioritizer component 110 is illustrated with metadata analyzer 112, content analyzer 114 and prioritization module 116. In embodiments, metadata analyzer 112 may be configured to analyze the metadata 106 from video 102 to determine metadata-based prioritization data 113. Content analyzer 114 may be configured to analyze content 104 to determine content-based prioritization data 115. Prioritization module 116 may be configured to prioritize the frames of the video based on the metadata-based prioritization data 113 and/or the content-based prioritization data 115. The prioritizer component 110 may output the video prioritization data 118 (e.g., as metadata to be incorporated into metadata 106 of video 102, or to be stored in a data store) or send the video prioritization data 118 to summarizer component 130, in embodiments.

Classifier component 120 is illustrated with metadata analyzer 122, content analyzer 124 and classification module 126. In embodiments, metadata analyzer 122 may be configured to analyze the metadata 106 from video 102 to determine metadata-based classification data. Content analyzer 124 may be configured to analyze frame content 104 to determine content-based classification data and classification module 126 may be configured to classify the frames of the video into a classification based on the metadata-based classification data and/or the content-based classification data. The classifier component 120 may output video classification data 128 (e.g., as metadata to be incorporated into metadata 106 of video 102, or to be stored in a data store) or send the video classification data 128 to summarizer component 130, in embodiments.

In the above description of the video analyzer, some embodiments describe the classifier component 120, the prioritizer component 110 and the summarizer component 130 as independently performing various techniques such as analysis of video data and metadata. However, in at least some embodiments, these components may interact with one another during processing and analysis of the video data and metadata. For example, the prioritizer component 110 and the classifier component 120 may interact during analysis to determine and/or satisfy interdependencies among the prioritized segments and the classified groups. For instance, frames across portions of two different classification groups may be prioritized into a single segment or various different portions of several prioritized segments may be classified into one or more different classification groups.

In embodiments, metadata may be used to tune components or modules of the video analyzer such as the content analyzer. For example, video or images shot at night (which could have important content) may have different criteria for what is lower quality (e.g., lower quality warranting lower prioritization score or grade) than video shot during day. In another example, if the photographer is moving at a high velocity (e.g. in a car), some shakiness may be expected (e.g., prioritization of a frame or scene may not be lowered even though shakiness may normally lower the prioritization score or grade).

Video analyzer 108 is illustrated with summarizer component 130 that includes summary generator module 132. As illustrated, summary generator 132 may receive video prioritization data 118 and/or video classification data 128 from corresponding prioritizer and classifier components 110, 120. Summary generator 132 may apply the techniques describe herein to use the received data to generate video summary data 134, in embodiments. Video summary data 134 may include summary metadata, editing suggestions, or hints that may, for example, be used by a video editor (e.g., video editor 902 in FIG. 9) to provide suggestions via a user interface or to automatically generate summary or highlight videos.

Figure 2:
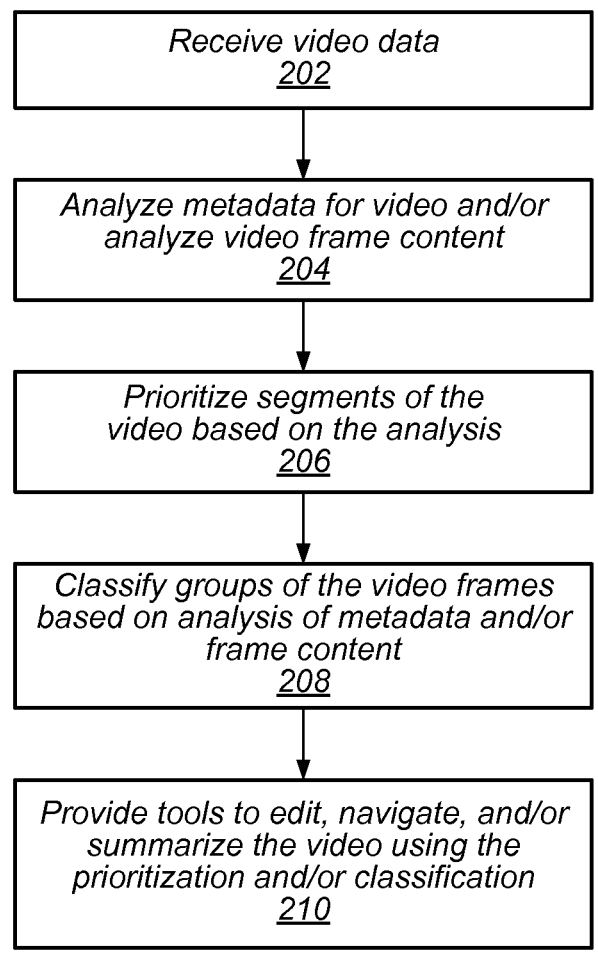
FIG. 2 is a flow diagram of a process of video analysis for improved video editing, navigation and summarization, according to some embodiments.

FIG. 2 illustrates a process for analyzing video data and metadata and providing improved video editing, navigating and summarization tools based on the analysis. In some embodiments, the process illustrated in FIG. 2 may be performed by various devices including but not limited to video analyzer 108, system 702 or video editor 902. Although the process is illustrated in a particular order, various other embodiments include performing the process in a different order from the illustrated embodiment.

As illustrated in FIG. 2, at block 202, video data is received. For example, video data may be received within an image signal processor, as output from the image signal processor, or as post-processing by a device other than the image capture device. At block 204, metadata for video and/or video frame content may be analyzed. In some embodiments, a metadata analyzer (e.g., 112 or 122) may analyze the video metadata (e.g., 106) and a content analyzer (e.g., 114 or 124) may analyze the video frame content. At block 206, segments of the video may be prioritized based on the analysis (by prioritization module 116 for example). In some instances, more important segments of the video, such as those that are determined to have faces in them may be given a higher score or ranking than other segments of video without faces, although numerous other ranking/scoring schemes are contemplated and disclosed herein. At block 208, groups of the video frames may be classified based on analysis of the metadata and/or the frame content (by classification module 126 for example). For instance, some groups of frames may be classified as having poor focus or as redundant, although numerous other classifications are contemplated and disclosed herein. At block 210, tools to edit, navigate and/or summarize the video using the prioritization and/or classification may be provided (e.g., via a user interface of video editor 902 in FIG. 9).

Figure 3:
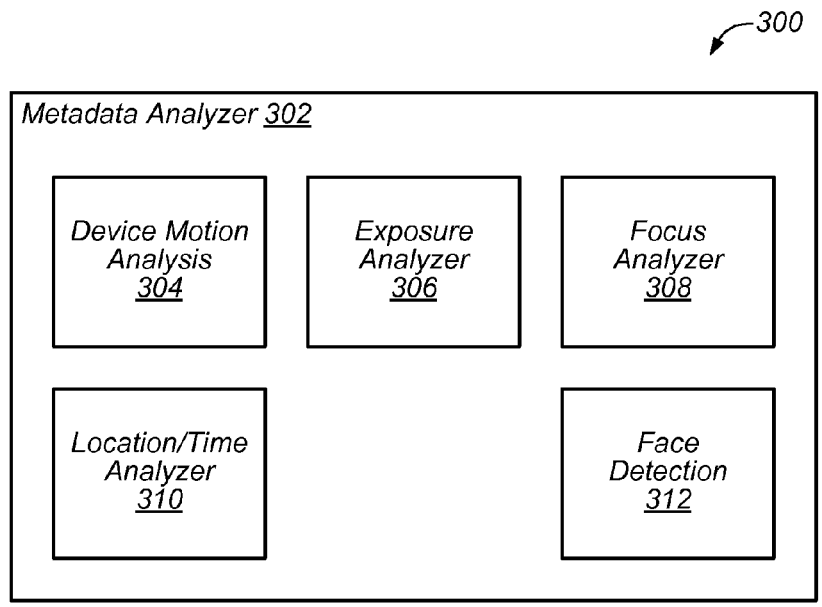
FIG. 3 is a block diagram of a metadata analyzer, according to some embodiments.

FIG. 3 illustrates a metadata analyzer 302, according to various embodiments. In embodiments, metadata analyzer 302 analyzes existing metadata of image or video content using various techniques, described below. As illustrated in FIG. 1, different metadata analyzers 112, 122 may be particularly configured for each of the prioritization 110 and classifier 120 components. FIG. 3 illustrates a metadata analyzer 302 that may be customized for either component or may serve as the same metadata analyzer for both components, in various embodiments.

Metadata analyzer 302 is illustrated with five different modules, but may be configured with fewer or more modules with less or additional functionality without departing from the scope of this disclosure. The five modules of the metadata analyzer illustrate different techniques for analyzing metadata and video/audio signals in image and video data, although other techniques are contemplated as well. In embodiments, the modules may analyze different types of metadata and the results of the analysis may be passed to a prioritization 110 or classifier 120 module. In some embodiments, the results from the metadata analyzer 302 may be used to remove undesirable portions of the video.

Metadata analyzer 302 is illustrated with device motion analysis module 304 that may analyze metadata for motion information such as motion information obtained from a motion sensor (e.g., a gyroscope or accelerometer or combination of the two). Such motion information may be used to detect camera motion and in some embodiments, frames or scenes which have widely varying motion (e.g., due to a shaky camera) can be removed or prioritized lower than frames or scenes without widely varying motion, although other techniques may also make use of the motion information.

Exposure analyzer 306 is illustrated as part of metadata analyzer 302 in FIG. 3. The exposure analyzer module 306 may analyze exposure characteristics, such as exposure time, digital gain, analog gain, and/or brightness to detect over-exposed or under-exposed frames/scenes. Over-exposed scenes, under-exposed scenes, and scenes in which the exposure changes too quickly may all be removed or be assigned a lower priority, in some embodiments.

Focus analyzer 308, illustrated in metadata analyzer 302, may analyze focus information, such as focus position changes to detect out of focus frames and/or hint to the overall quality of the frame, in embodiments.

Location/time analyzer 310 may analyze the location and time of the captured video. Such information may be used to help segment the video sequence into different clips, and generate a single video summary based on multiple video sequences, in embodiments. In some instances, timestamps of different video sequences can help group videos taken at the same time together Face detection module 312 may detect and recognize faces and face recognition data can be used to understand if people are in the scene, and if a same person is in the scene, in embodiments.

Figure 4:
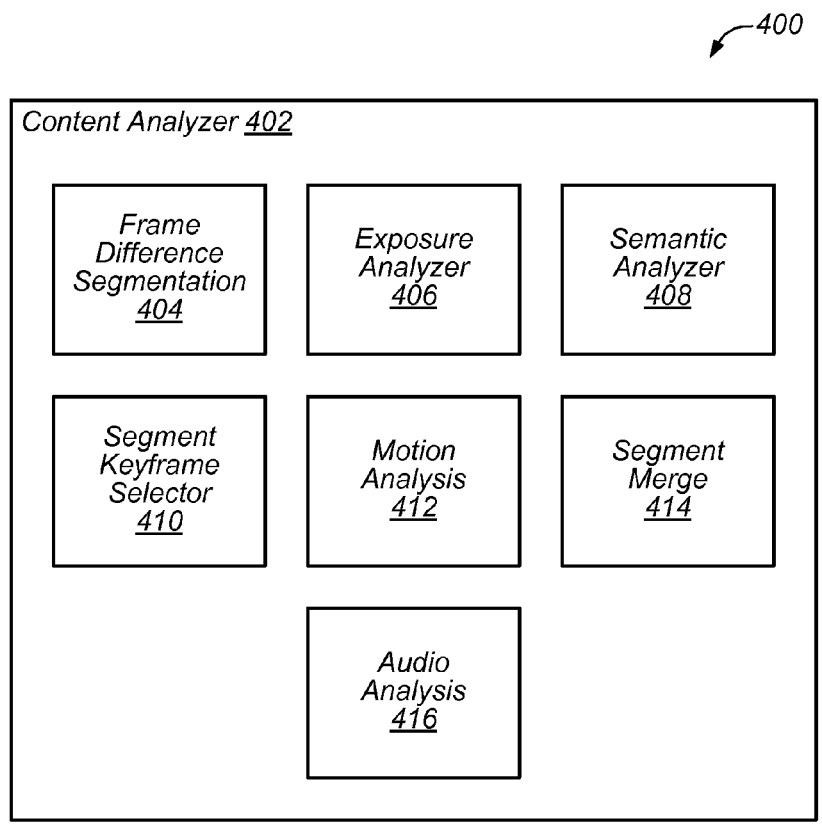
FIG. 4 is a block diagram of a content analyzer, according to some embodiments.

FIG. 4 illustrates a content analyzer 402 that may analyze the image or video content to determine metadata or information used in various analysis described herein. Content analyzer 402 is illustrated with seven modules, but may include fewer or additional modules with additional features, in some embodiments.

As illustrated in FIG. 1, different content analyzers 114, 124 may be particularly configured for each of the prioritization 110 and classifier 120 components. FIG. 4 illustrates a content analyzer 402 that may be customized for either component or may serve as the same content analyzer for both components, in various embodiments. The modules of the content analyzer 402 may analyze different portions of image or video content and the results of the analysis may be passed to a prioritization 110 or classifier 120 module, in embodiments.

Content analyzer module 402 is illustrated with frame difference segmentation module 404 that may use differences between neighboring frames (such as histogram difference) to detect scene changes and refine the segmentation results using metadata, in embodiments.

Exposure analyzer module 406 may detect over-exposed and under exposed frames by analyzing the intensity value of the video frame content, in embodiments.

Semantic analyzer module 408 may analyze image content using techniques such as edge detection, texture analysis, and face detection, to help determine the semantic of the image and whether it should be removed or not, in embodiments.

Segment keyframe selector 410 may perform image content analysis, and image difference analysis within a chunk of frames, for example, to determine the key frames of the current chunk, and whether the key frame can be included in the final highlight video.

Motion analysis module 412 may perform motion analysis of the video (e.g., via motion estimation or object tracking) to understand the temporal characteristics, in embodiments.

Segment merge module 414 may use the difference between different chunks to help determine whether the chunks can merge into a single chunk and may refine the segmentation frame for the chunks. In some embodiments, the segment merge module may use the metadata (e.g., location metadata or face recognition data) as well.

Audio analysis module 416 may detect audio and speech, for example, to identify starting and ending points of conversations, music and other meaningful audio signals, in embodiments. In some instances, (e.g., aside from speech) large changes in amplitude could precede/follow (e.g. applause) or correlate with (e.g. fireworks) a key event. Audio can be used to bound key frames within a segment, in embodiments.

Figure 5:
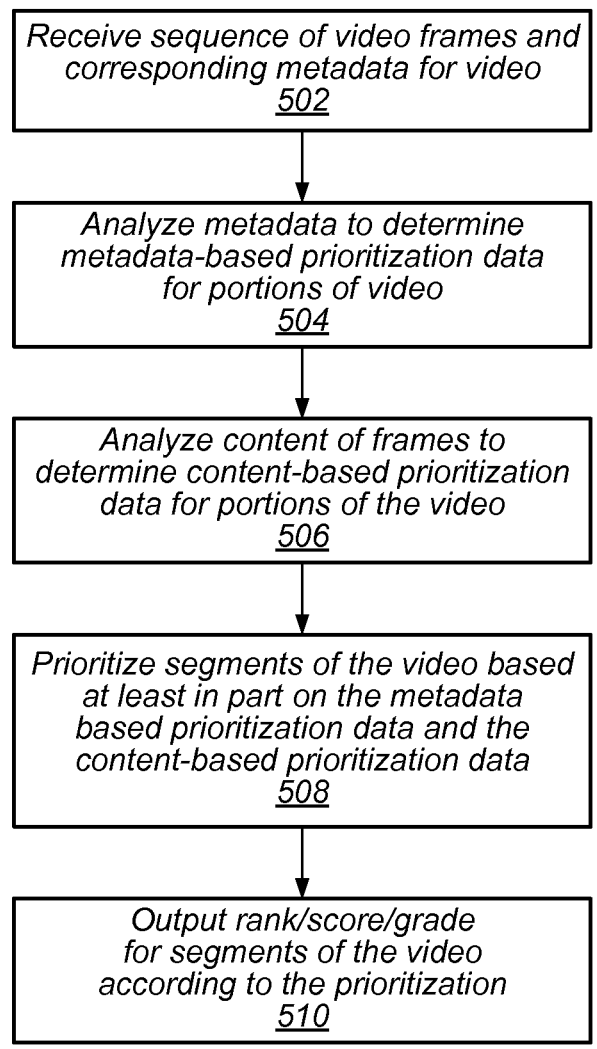
FIG. 5 is a flow diagram of a process for prioritization of video, according to some embodiments.

FIG. 5 illustrates a process for analyzing metadata and image content to rank/score/grade segments or other portions of video (e.g., segments, groups or scenes). In embodiments, the analysis and ranking/scoring/grading may be performed by a prioritizer component (e.g., 110) of a video analyzer. In embodiments, prioritization may be based on image quality, although prioritization may be based on other factors as well.

Sequences of video frames and corresponding metadata for the video may be received (block 502). In some embodiments, the sequences may be from the same video session or from multiple different video sessions (e.g., from the same device or different devices). The sequences may be received within an image signal processor, from an image signal processor, from system memory of the image capture device or as part of post processing on a device distinct from the image capture device.

The metadata may be analyzed to determine metadata-based prioritization data for portions of the video (block 504). For example, metadata-based prioritization data 113 may be determined for segments determined by the prioritizer component 110 or for groups of video data determined by the classifier component 120. In some embodiments, the metadata and techniques described in FIG. 3 may be used to determine prioritization data for portions of the video, although other techniques and other metadata are contemplated as well.

Image content of frames may be analyzed to determine content-based prioritization data for portions of the video (block 506). In embodiments, the content and content analysis techniques described in FIG. 4 may be used to determine content-based prioritization data 115 for portions of the video, although other techniques are also contemplated without departing from the scope of this disclosure.

Segments of the video may be prioritized based at least in part on the metadata-based prioritization data and the content-based prioritization data (block 508). For example, the metadata-based prioritization data 113 and the content-based prioritization data 115 illustrated in video analyzer 108 of FIG. 1 may be used to prioritize segments of the video.

A rank, score, or grade may be output for segments of the video according to the prioritization (block 510). For instance, the prioritizer 110 may output video prioritization data (e.g., a rank, score or grade) to the summary generator 132 or to a data store or to system memory of the image capture device or to tools of a video editor application (e.g., video editor 902 in FIG. 9, described below).

Figure 6:
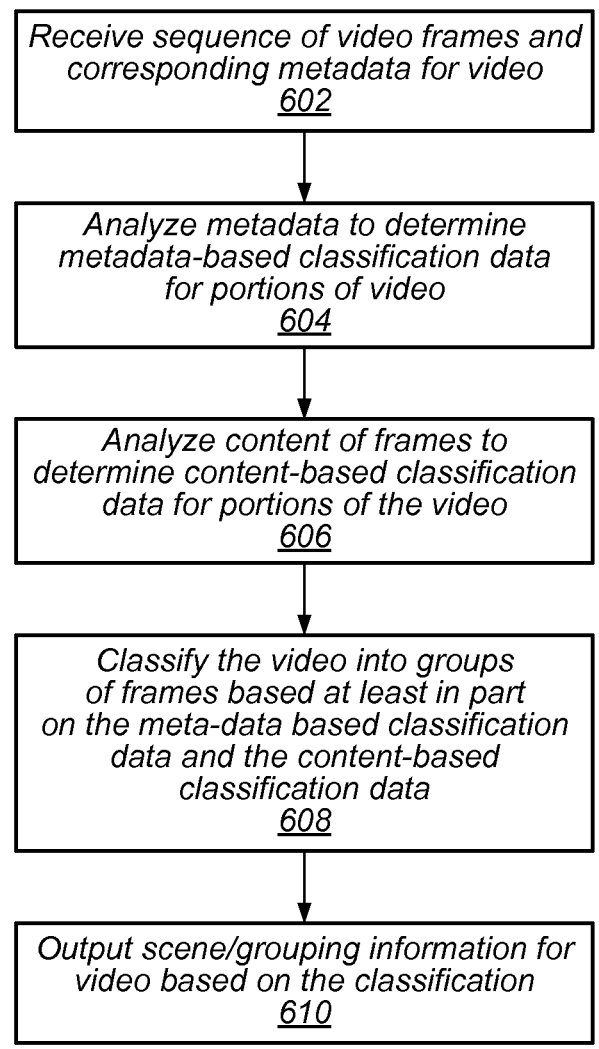
FIG. 6 is a flow diagram of a process for classification of video, according to some embodiments.

FIG. 6 illustrates a process for determining scene/grouping information based on analysis of a sequence of video frames and corresponding metadata for the video. In embodiments, the illustrated process may be performed by a classifier module (e.g., 120) of a video analyzer.

At block 602, a sequence of video frames and corresponding metadata for the video may be received. In embodiments, the analysis may be performed by a classifier component (e.g., 120) of a video analyzer. The video frames and the metadata may be received with an image signal processor, from an image signal processor, or at a device separate from the image signal processor, for example.

At block 604, metadata may by analyzed to determine metadata-based classification data for portions (e.g., groups) of the video. In embodiments, the portions may be from the same video session or from multiple different video sessions. The portions may be received within an image signal processor, from an image signal processor, from system memory of the capture device or as part of post processing on a device distinct from the image capture device.

At block 606, the content of frames are analyzed to determine content-based classification data for portions of the video. For example, the content and content analysis techniques described in FIG. 4 may be used to determine content-based classification data for portions of the video, although other techniques are also contemplated without departing from the scope of the disclosure.

The video may be classified into groups of frames based at least in part on the metadata-based classification data and the content-based classification data (block 608). For example, the metadata-based classification data 123 and/or the content-based classification data 125 illustrated in video analyzer 108 of FIG. 1 may be used to classify portions or groups of the video.

At 610, scene/grouping information may be output for the video based on the classification. For example, classifier 120 may output classification information (e.g., scene/grouping information) to the summary generator 132, or to system memory of the image capture device, or to tools of a video editor application (e.g., video editor 902 in FIG. 9, described below).

Figure 7:
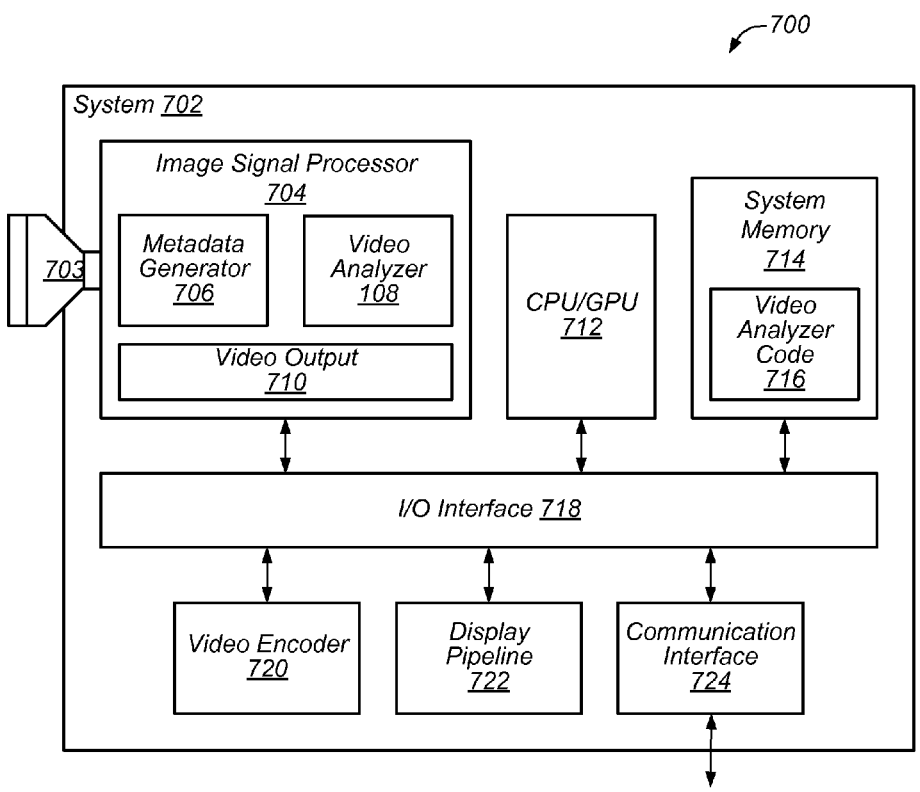
FIG. 7 illustrates a system diagram of a camera-based device with a metadata generator and a video analyzer, according to some embodiments.

FIG. 7 illustrates a system (e.g., an image capture device) with a camera, and an image signal processor 704 that may be configured, among other functionality, to process captured images into processed versions of the captured image, generate metadata based on analysis of various characteristics of the captured images and output the video and metadata. The system 702 may perform the metadata generation process illustrated in FIG. 8, in embodiments. In some embodiments, a processed version of the captured image may be analyzed to determine metadata, or an unprocessed or partially processed version of the captured image may be analyzed to determine metadata corresponding to the captured image.

System 702 may include one or more image sensors 703. Image sensor 703 may also be known as or called an optical sensor. An optical sensor may include charge-coupled device (CCD) or complementary metal-oxide semiconductor (CMOS) phototransistors. Optical sensor receive light from the environment, projected through one or more lens, and converts the light to data representing an image. An optical sensor may capture still images or video. In some embodiments, an optical sensor is located on the back of system (e.g., a phone), opposite a display on the front of the system, so that the display may be used as a viewfinder for still and/or video image acquisition. In some embodiments, another optical sensor is located on the front of the device so that the user's image may be obtained for videoconferencing while the user views the other video conference participants on the touch screen display.

Image signal processor 704 may interoperate with CPU/GPU 712, system memory 714, video encoder 720 and display pipeline 722 via I/O interface 718 while performing various functions such as image capture, processing, coding/decoding, image and metadata analysis, or storage and transmission. In embodiments, the various components shown in FIG. 7 may be implemented in hardware, software, or a combination of hardware and software, including one or more signal processing and/or application specific integrated circuits (ASIC). In some embodiments, image sensor data processor 704 may be implemented as a single programmable application-specific integrated circuit (ASIC). In other embodiments, multiple separate integrated circuits can be used.

In some embodiments, the image signal processor 704 may perform pre-processing adjustments to a captured raw image such as adjustments for white balance or adjustments for lens distortions, for example. The adjustments may be implemented via ASIC or software, or a combination thereof. The adjustments may be stored as metadata.

The image signal processor 704 may perform content-based or metadata-based analysis. In some embodiments, image signal processor 704 may analyze raw captured images directly from the image sensor 703. Metadata generator may analyze the images and determine and/or generate metadata (e.g., the metadata described in FIGS. 3 and 4). The metadata may be output with the video content via video output 710, in embodiments (e.g., in the same or separate files).

The image signal processor 704 outputs image data to I/O interface 718, in embodiments. For example, image signal processor 704 may output a processed/compressed frame with metadata to system memory or some other system component.

System memory 714 may include video analyzer code 716 (e.g., video analyzer 108). The CPU/GPU 712 may execute the video analyzer code 716 to perform the techniques and processes described herein, such as content-based and metadata-based analysis to determine prioritization and classification of portions of the video. In various embodiments, the video analyzer code 716 may be distributed across multiple components of the system. For example, portions of the video analyzer code may be in the image signal processor 704 and other portions in the system memory 714, while other portions may reside in a video editor.

Communication interface 724 may comprise a wired or wireless transmission channel. For example, interface 724 may comprise RF (radio frequency) circuitry that receives and sends RF signals, also called electromagnetic signals. The RF circuitry of communication interface 724 may convert electrical signals to/from electromagnetic signals and communicates with communications networks and other communications devices via the electromagnetic signals.

The display pipeline may perform a sequence of steps to create a representation of the image/video data for display. A display may provide an input interface and an output interface between the system 702 and a user. The display may display visual output such as the representation of the image/video data to the user. The visual output may include graphics, text, icons, video, and any combination thereof (collectively termed "graphics"). The visual output may include various user-selectable interface elements associated with the analysis tools described herein, in embodiments.

Figure 8:
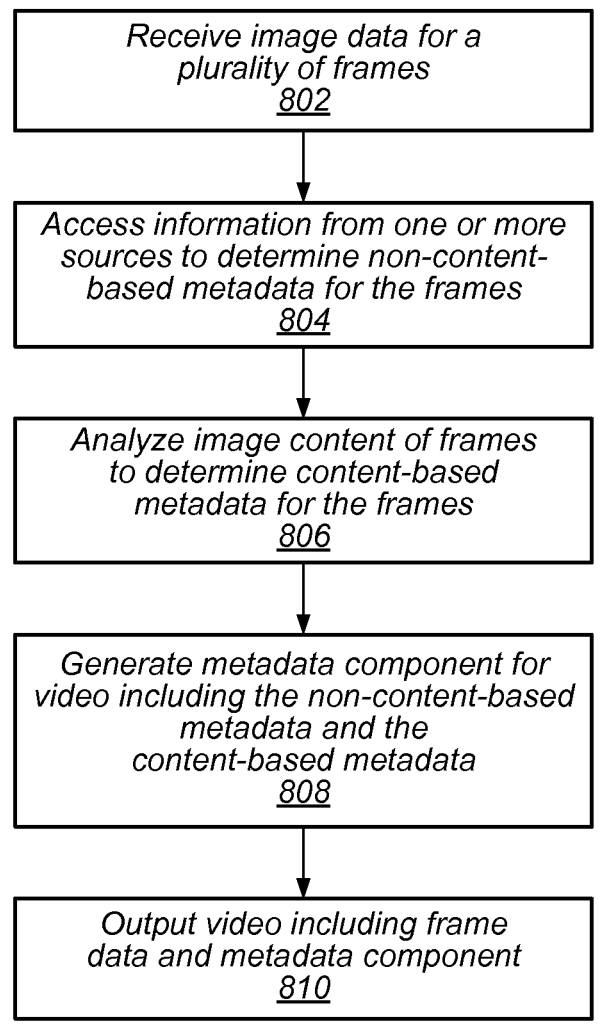
FIG. 8 is a flow diagram of a process for generating and outputting metadata, according to some embodiments.

FIG. 8 illustrates a process for generating metadata for video, according to embodiments. The process may be performed by numerous type of devices such as system 702, or by various applications such as video editor 902, for example. The process generally describes using information associated with frames (e.g., sensor-based or analysis-based) to determine, generate and output content and non-content-based metadata for the frames.

Image data for a plurality of frames is received (block 802), for example, by an image signal processor from an image sensor 703. Information from one or more sources is accessed to determine non-content-based metadata for the frames (block 804). A non-exhaustive list of example sources includes motions sensors, orientation sensors (e.g., magnetometer), altitude sensors (e.g., barometer), time sensors, and face detection sensors. In embodiments, the sources may be sources for the data analysis described in FIG. 3.

At block 806, image content of frames may be analyzed to determine content-based metadata for the frames, for example, by metadata generator 706 or video analyzer 108. Content-based metadata may include the content-based metadata described in FIG. 4, such as exposure, semantics, motion or audio, or the like.

A metadata component for the video may be generated including the non-content-based metadata and the content-based metadata (block 808). For example, the metadata generator 706 may generate the metadata for the video, based on the information from the sources or from the video analyzer 108, in embodiments.

In embodiments, encoding statistics as well as analysis of the video bit stream may be used to determine metrics and/or encoding-based metadata (e.g., quality metrics or metadata based on the coding tools used, references, qp, etc.). Such metadata may be used to bias the analysis towards prioritizing image data with preferred encoding-based metadata, in embodiments.

The video may be output and may include frame data and metadata components. For example, a video file may be output with both the frame data and the metadata, or separate files may be output, one for the frame data and another with the metadata. References between the frame data and the corresponding metadata may be in either file or a separate file, depending on the embodiment.

Figure 9:
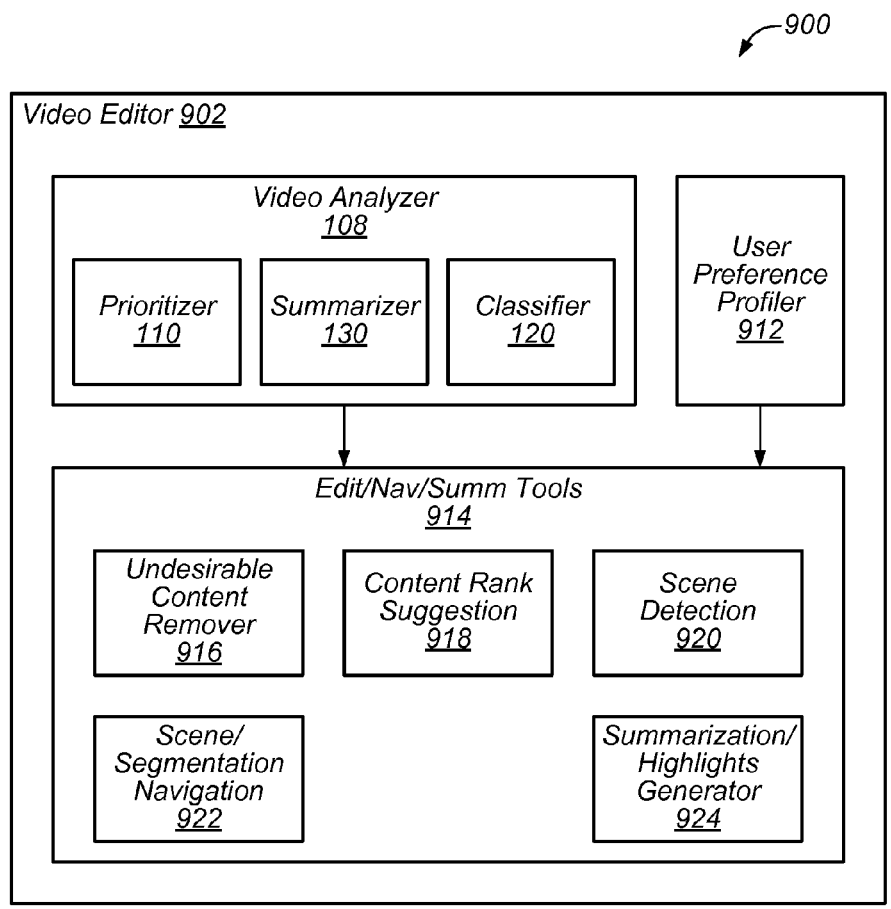
FIG. 9 is a block diagram of a video editor, according to some embodiments.

FIG. 9 illustrates a video editor 902 that includes a video analyzer 108, user preference profiler 912 and editing, navigation and summarization tools 914. In embodiments, the video editor may receive frame data and corresponding metadata, analyze the data and metadata (e.g., based on the techniques disclosed herein) and provide a user interface including editing, navigation, and/or summarization tools. In embodiments, the tools leverage the improved analysis of the video analyzer to provide improved editing, navigation and summarization tools. For example, video editor 902 may perform many of the processes described herein. The processes may be performed on a technique-by-technique basis (e.g., as selected by an operator, or automatically, perhaps all at once). In some embodiments, the video editor may provide automatic prioritization and elimination of certain segments based on classifications. Video editor 902 is illustrated with five editing, navigation, or summarization tools. A video editor may include fewer or additional tools with additional functionality than those illustrated without departing from the scope of this disclosure.

One of the illustrated tools is an undesirable content remover 916, which may, in embodiments, be used to automatically or manually remove undesirable portions of video content. For example, prioritization of groups (e.g., performed by prioritizer 110) may be used to automatically remove the least desirable segments while allowing an arbitrary length video to be generated (e.g., as a summary or highlights video). Prioritization may also be used to provide hints in or to a video editor (e.g., a user interface display-oriented editor) as to which segments are likely to be undesirable.

There are many aspects of what can be considered undesirable in a video sequence. Processes disclosed herein may allow automatic prioritization and elimination of certain portions of the video, based on classifications. As an example, the automatic-editor may remove some percentage or amount of the sequence classified as most undesirable or alternatively may always choose to remove any video below a certain quality threshold. The remaining video could then be further analyzed by manual use of the tools with hints provided by the (e.g., automatic) video editor as to which remaining scenes are undesirable.

An example technique that may be used to remove undesirable video is to analyze the motion from the gyroscope and accelerometer. Scenes which have widely varying motion (due to a shaky camera or unintentional recording) can be marked or removed, automatically or via user control of the tools, in embodiments.

Another example technique is to analyze the video for bad exposure. Over-exposed scenes, under-exposed scenes, and scenes in which the exposure changes too quickly can all be marked or removed, in embodiments. The digital gain, analog gain, scene luminance, and variance of the scene luminance throughout the scene may be used to determine bad exposure. Exposure can also be tied to scene position, determined by gyroscope and motion analysis, in order to eliminate widely fluctuating exposure within a single position, in embodiments.

Another example technique is to remove static scenes which contain almost no changes in video or audio. Scenes which contain almost no entropy in video or audio can be significantly shortened, in embodiments. Also, scenes which contain very low picture entropy or which are very blurry can also be classified for possible removal or automatically removed, in embodiments. In some instances, a focus score can be utilized to determine scenes in which a camera focus sweep was occurring and these scenes can also be removed or marked for removal.

Content rank suggestion module 918 is a tool that may be used to or may automatically provide ranking, grading or scoring of content. For example, video segments or groups may be prioritized and receive a score for how likely the segment is to be undesirable or unintentional. This score/prioritization can be used both as an auto-removal technique and as a hint for a higher-level video editor to be able to organize and edit video. A second score/prioritization can also be used to determine the priority of clips in an auto-generated summary clip, in embodiments. This can allow automatic flexibility in the creation of an arbitrary length summary clip.

Scene detection module 920 is a tool that may be used to or may automatically provide detection and/or classification of scenes in the video. For example, scenes which are obstructed by an unintentional object may be detected and classified (e.g., by classifier component 120) for possible removal. This could include an accidental finger covering part of the lens or a person or object temporarily obstructing the camera view, for example. Additionally, or alternatively, scenes with audio (e.g., significant amounts of audio or talking in particular) may be detected and classified such that they are given a higher priority and are less likely to be removed, in embodiments.

Scene-detection can be used to determine where scene breaks are to assist in representing most of the scenes of a sequence. Both video and audio scene breaks can be determined and used, in embodiments. Motion analysis (e.g., using the gyroscope and accelerometer) and/or video content analysis can help determine what should be classified as a single scene, in embodiments. Voice-analysis can also be used to determine who is talking at a particular time and allow scene-breaks based on the speaker, in some instances. Other audio analysis can determine the duration and starting/ending point of certain audio signal captured in the video sequences, in embodiments. Video/audio characteristics generated from analysis may be used to group video segments together. In some embodiments, the classification of video segments can be illustrated or displayed visually in order to aid video editing.

Scene/segmentation navigation module 922 is a tool that maybe used to or may automatically provide scene navigation. For example, once portions/scenes of the video have been identified, the navigation tool may provide user interface elements that provide navigation among the portions/scenes. The navigation may be among portions/scenes of the video being edited or among portions of a summary video generated by the video editor, in embodiments.

Summarization/highlights generator module 924 is a tool that may be use to or may automatically suggest or provide summarization or highlight video based on the video content and video metadata. For example, the summarization/highlights generator module 924 may obtain or receive video prioritization and/or classification metadata a remove or organize portions of the video according to the metadata such that a reduced-length video is generated. In embodiments, the reduced-length video may include the important or most desirable scenes, as determined via the techniques described herein.

In some embodiments, it may be desirable to reduce a video to a specific size for compressing or sending over a network. There may also a need for summarizing a video in such a way that most of the interesting parts of the video are well-represented, in embodiments. Both of these goals can be addressed with techniques described herein. For example, prioritization may be performed that classifies the value and length of each scene/group. A summary can then be generated which trims each scene/group down based on the determined importance. In the case where no fixed output size is used, the length of the summary can be determined by the amount/number of important scenes in the sequence, in embodiments.

In embodiments, editing suggestions or a video summary may be generated based on considering three-dimensional information. For example, multiple images/videos of the same landmark may be captured from different viewpoints. The three-dimensional information of the landmark may be recovered (e.g., partially or wholly) using image-based analysis of the multiple images/videos and used for summarization, such as a summary video that depicts a three-dimensional representation of the landmark. Similar processes may be applied to objects other than landmarks, in embodiments.

Summarization may make use of synthesized frames, in embodiments. For example, intermediate frames may be synthesized using portions of high quality frames to replace portions of or entire low quality frames.

Video editor 902 is illustrated with user preference profiler 912. In embodiments, the preference profiler may obtain social data, historical editing selections, user-configurable user preferences, or the like. For example, the social data may be obtained or received from a social networking website, the historical editing selections might be obtained from past user selections for editing or summarizing video and user configurable user preferences may be obtained via a user interface for the editor or for a device that includes the editor and stored in a data store. In embodiments, the information stored or obtained by the user preference profiler may be used to generate personalized video summaries, as described herein. For example, if the configurable user preferences describe that the user prefers summary videos of a particular length, the summarization tool may automatically generate video of that length or if the user has a history of only including scenes with faces in summaries, the summarization tool may only generate summaries with scenes that include faces.

In various embodiments, the techniques described herein may be applied to still images or a combination of still images and video segments.

Figure 10:
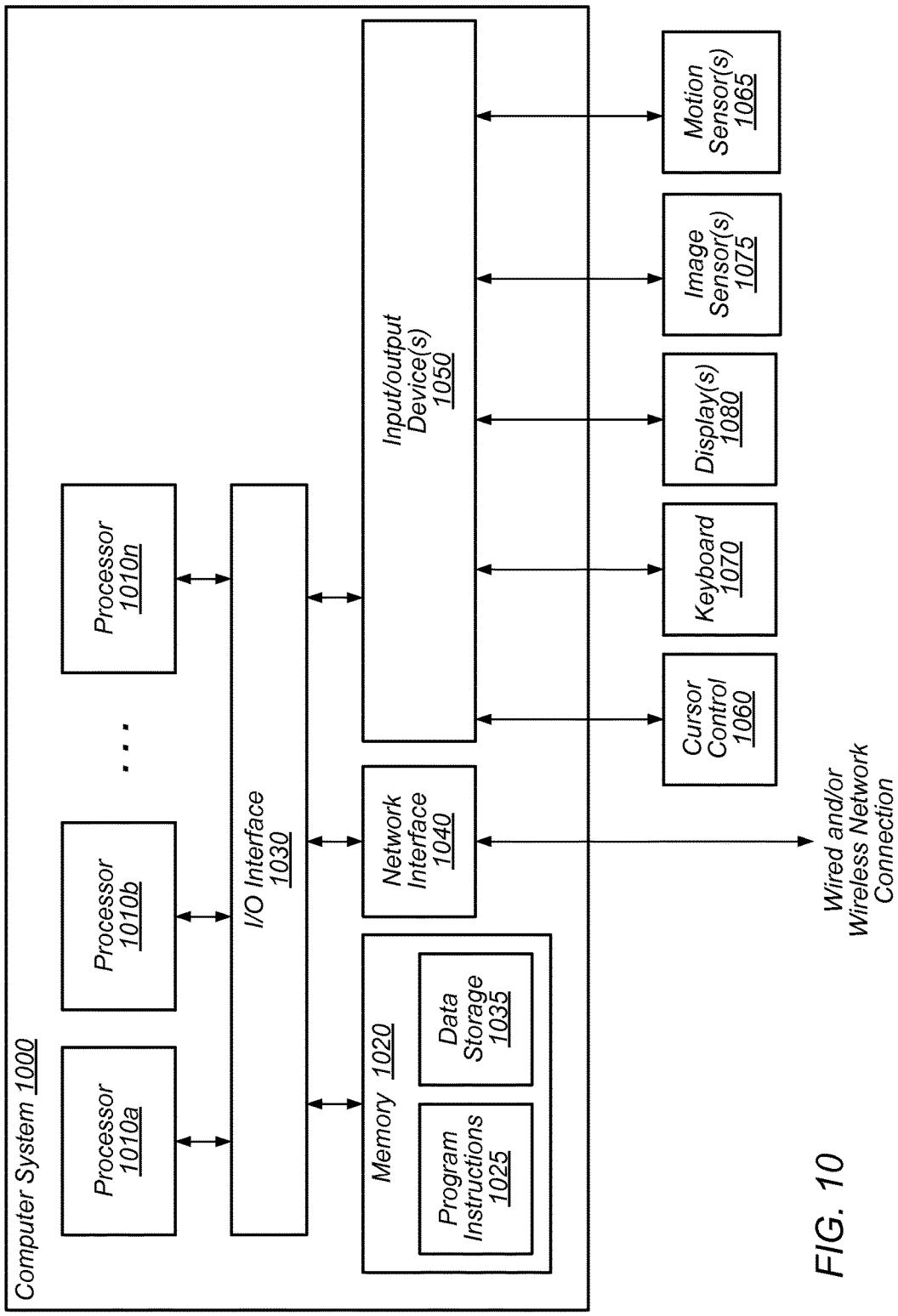
FIG. 10 is a block diagram illustrating an example computer system that implements some or all of the techniques described herein, according to different embodiments.

FIG. 10 illustrates computer system 1000 that is configured to execute any or all of the embodiments described above. In different embodiments, computer system 1000 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for video analysis techniques for video editing, video navigation and video summarization, as described herein, may be executed on one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, motion sensor(s) 1065 and image sensor(s) 1075. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g. two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1025 and/or data 1035 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1025 may be configured to implement video analysis or video editing application incorporating any of the functionality described above. Additionally, data storage 1035 of memory 1020 may include video content and video metadata, including any of the information or data structures described above, including but not limited to video images or frames and corresponding metadata used in implementing the techniques described herein. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g. system memory 1020) into a format suitable for use by another component (e.g. processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g. carrier or agent devices) or between nodes of computer system 1000. The network may in various embodiments include one or more networks including but not limited to Local Area Networks (LANs) (e.g. an Ethernet or corporate network), Wide Area Networks (WANs) (e.g. the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, which may be processor-executable to implement any element or action described above. In one embodiment, the program instructions may implement the methods described above, such as the methods illustrated by FIGS. 2, 5, 6, and 8. In other embodiments, different elements and data may be included. Note that data 1035 may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
one or more processors configured to implement a video analyzer comprising:
a prioritization component configured to receive video data and provide prioritization information for a plurality of segments of the video data, wherein the received video data comprises a plurality of frames and corresponding metadata comprising one or more of: difference between neighboring frames metadata, contrast metadata, color distribution metadata, text detection metadata, landmark detection metadata, exposure metadata that is based on analysis of video content, or key frame identification metadata, the corresponding metadata generated by a device that generated the video data, wherein the prioritization component comprises:
a metadata analyzer configured to determine, based at least in part on analysis of the received corresponding metadata that was generated by the device that generated the video data, metadata-based prioritization data for prioritizing one or more portions of the video data;
a content analyzer configured to analyze content of the plurality of frames and determine content-based prioritization data for one or more portions of the video data based at least in part on the analysis of the content of the plurality of frames; and
a video prioritization generator configured to generate the prioritization information based at least in part on the metadata-based prioritization data that was determined based at least in part on analysis of the received corresponding metadata that was generated by the device that generated the video data, and the content-based prioritization data, wherein the prioritization information indicates a priority for the plurality of segments of the video data; and
a classification component configured to receive the video data and provide classification information for a plurality of groups of the video data, wherein the classification component comprises:
a classification metadata analyzer configured to analyze the metadata from the video data and determine metadata-based classification data from one or more portions of the video data based at least in part on analysis of the metadata;
a classification content analyzer configured to analyze content of the plurality of frames and determine content-based classification data from one or more portions of the video data based at least in part on analysis of the content of the plurality of the frames; and
a video classification generator configured to generate the classification information based at least in part on the metadata-based data and the content-based data, wherein the classification information indicates a class for the plurality of groups of the video data; and
wherein the video analyzer is configured to provide the prioritization information and the classification information for the video data.

2. The system of claim 1, wherein the video analyzer further comprises a summarizer component configured to:
receive the prioritization information and the classification information;
generate a summary video based on the prioritization and classification information, the generation comprising removal of portions of video data and organization of the remaining video data; and
output the generated summary video.

3. The system of claim 1, wherein the metadata comprises non-content-based metadata for at least some of the plurality of frames, wherein the non-content-based metadata comprises one or more of: motion information for a device capturing the video data, exposure information for the device capturing the video data, focus position information for the device capturing the video data, location information for the device capturing the video data, or time data for when the video data for a plurality of frames was captured.

4. The system of claim 1, wherein the metadata comprises content-based metadata for at least some of the plurality of frames, wherein the content-based metadata is based at least in part on content analysis of the video data, wherein the content-based metadata comprises one or more of: motion data, similarity data, or face detection data.

5. A method, comprising:
receiving, by a video analyzer:
video data comprising a plurality of frames, and
corresponding metadata that was generated by a device that generated the received video data;
prioritizing, by the video analyzer, a plurality of segments of the video data, wherein said prioritizing comprises analyzing the metadata that was generated by the device that generated the received video data to determine metadata-based prioritization data for one or more portions of the video data, analyzing content of the plurality of frames to determine content-based prioritization data for one or more portions of the video data, and determining the prioritization based at least in part on combining the metadata-based prioritization data and the content-based prioritization data;
classifying, by the video analyzer, the video data into a classification comprising a plurality of groups of the frames, wherein said classifying comprises analyzing the metadata that was generated by the device that generated the received video data to determine metadata-based classification data for one or more portions of the video data, analyzing content of the plurality of frames to determine content-based classification data for one or more portions of the video data, and classifying the frames of the video data into the classification groups based at least in part on combining the metadata-based classification data and the content-based classification data;
wherein the prioritizing and the classifying comprise distinct determinations for the same video data; and
editing, navigating, or summarizing the video data based at least in part on the prioritization or the classification.

6. The method of claim 5, wherein editing the video data comprises removing undesirable portions of the video data based at least in part on the classification data and the prioritization data of the video data, wherein an amount of the video data removed is a portion of the video data that falls below an image quality threshold or is based on a threshold amount of the video data that is classified as undesirable.

7. The method of claim 5, further comprising:
generating content ranking scores for segments of the video data based at least in part on the prioritization for the plurality of segments of the video data; and
wherein editing the video data comprises removing segments of the video data based on respective ranking scores.

8. The method of claim 7, wherein summarizing the video data comprises:
generating other content ranking scores for remaining segments of the video data based at least in part on an importance of each respective segment;
determining a length for a summarization video based at least in part on a number of important scenes in the video data; and
generating a summarization video based on the other content ranking scores of the remaining segments of the video data and the determined length.

9. The method of claim 8, further comprising:
determining the importance of each respective segment, wherein increased importance is based at least in part on face recognition or speech recognition; and
wherein the determined importance is used to perform the generation of the other content ranking scores.

10. The method of claim 5,
wherein editing the video data comprises:
   determining a plurality of scenes in the video data based on analysis of:
      location or time metadata associated with the video data,
      differences between neighboring frames,
      image-based content analysis,
      motion analysis, or
      audio characteristics; and
   generating a story board comprising at least some of the plurality of scenes; and
wherein navigating the video data comprises:
   displaying the story board; and
   providing navigation tools for navigating among the plurality of scenes of the displayed story board.

11. The method of claim 5, further comprising:
determining a user preference profile for a particular user based on at least one of social data, historical editing selections, or user-configurable user preferences; and
wherein editing the video data comprises generating editing suggestions based at least in part on the user preference profile; or
wherein summarization of the video data comprises generating a summary video based at least in part on the user preference profile.

12. A method, comprising:
receiving, by an image signal processor, image data for a plurality of frames as the frames are being captured by an image sensor;
determining, by the image signal processor, non-content-based metadata for at least some of the plurality of frames while the respective frame is in the image signal processor, wherein the non-content-based metadata that is determined by the image signal processor while the respective frame is in the image signal processor comprises one or more of: motion information for a device capturing the image data, exposure information for the device capturing the image data, focus position information for the device capturing the image data, location information for the device capturing the image data, or time data for when the image data for a plurality of frames was captured;
determining, by the image signal processor, content-based metadata for at least some of the plurality of frames while the respective frame is in the image signal processor, wherein the content-based metadata is based at least in part on content analysis of the image data, wherein the content-based metadata that is determined while the respective frame is in the image signal processor comprises one or more of: difference between neighboring frames metadata, contrast metadata, color distribution metadata, text detection metadata, landmark detection metadata, or key frame identification metadata; and
outputting, from the image signal processor, video data based at least in part on the image data for a plurality of frames and including at least some of the non-content-based metadata and at least some of the content-based metadata in the output video data.

13. The method of claim 12, further comprising:
generating prioritization information for one or more of the plurality of frames based at least in part on the non-content-based metadata and the content-based metadata, wherein the prioritization information indicates a priority among the plurality frames; and
incorporating the generated prioritization information into metadata for respective frames.

14. The method of claim 12, further comprising determining a prioritization for a plurality of segments of the image data, wherein said determining the prioritization comprises analyzing the metadata from the image data to determine metadata-based prioritization data for one or more portions of the image data, analyzing content of the plurality of frames to determine content-based prioritization data for one or more portions of the image data, and determining the prioritization based at least in part on combining the metadata-based prioritization data and the content-based prioritization data.

15. The method of claim 14, the method further comprising:
generating editing suggestions or a highlights video based at least in part on the prioritization metadata; and
instructing display of the editing suggestions or the highlights video.

16. The method of claim 12, further comprising classifying the image data into a classification comprising a plurality of groups of the plurality of frames, wherein said classifying comprises analyzing the metadata from the image data to determine metadata-based classification data for one or more portions of the image data, analyzing content of the plurality of frames to determine content-based classification data for one or more portions of the image data, and classifying the frames of the image data into the classification based at least in part on combining the metadata-based classification data and the content-based classification data.

* * * * *